United States Patent Office 3,647,814
Patented Mar. 7, 1972

3,647,814
METHOD FOR PREPARING 4-SUBSTITUTED-1,2,4-TRIAZOLES
Stanley A. Greenfield, Hatboro, Pa., assignor to Rohm and Haas Company, Philadelphia, Pa.
No Drawing. Filed July 3, 1969, Ser. No. 839,081
Int. Cl. C07d 55/06, 55/00, 99/10
U.S. Cl. 260—308 R                    4 Claims

ABSTRACT OF THE DISCLOSURE

A method for preparing a 4-substituted-1,2,4-triazole which comprises reacting an N-alkoxymethylene-N'-formylhydrazine with a primary amine.

This invention is concerned with a novel method for preparing 4-substituted-1,2,4-triazoles of the formula

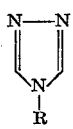

(I)

wherein R is selected from the group consisting of alkyl, straight or branched, of 1 to 18 carbon atoms which may be substituted with one or more halo preferably chloro, lower alkoxy, hydroxy, phenyl, nitro, lower-alkylamine or di(lower-alkyl)amino groups, a COY group wherein Y stands for OH, lower alkyl, lower alkoyl or the $NR^1R^2$ group wherein $R^1$ and $R^2$ are hydrogen or lower alkyl, and a phenoxy or thiophenoxy group which may be substituted in the aryl group with lower alkyl, lower alkoxy, halo preferably chloro, or nitro groups; alkenyl of 2 to 6 carbon atoms; alkynyl of 2 to 6 carbon atoms; cycloalkyl of 3 to 8 carbon atoms; aralkyl of up to 10 carbon atoms; aralkyl of up to 10 carbon atoms substituted in the aryl group with lower alkyl, lower alkoxy, halo preferably chloro, and nitro groups; aryl; lower alkyl, lower alkoxy, halo preferably chloro and nitro substituted aryl; and heterocyclic groups, preferably selected from the group consisting of 2-pyridyl, 3-pyridyl, 4-pyridyl, 3-(1,2,4-triazyl), 4-(1,2,4-triazyl), 2-pyrimidyl, 2-thiazyl, 2-benzothiazyl and its chlorinated derivatives. The term lower as used above refers to a carbon content of 1 to 6 carbon atoms.

The 4-substituted-1,2,4-triazoles are useful as fungicides, particularly for the control of rusts on cereals, and as intermediates for the preparation of pesticidal compounds.

The synthesis of 4-substituted-1,2,4-triazoles has been reviewed by K. T. Potts, Chemical Reviews 61, 95–6 (1961). As stated therein the method of choice for the preparation of the compounds of this invention has been the reaction of an aliphatic, aromatic or heterocyclic primary amine (R"NH$_2$) with diformylhydrazine. The following reaction depicts this.

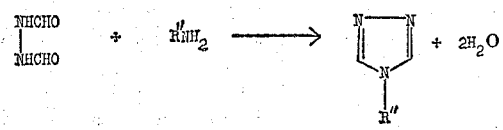

For examples of this see Ainsworth et al., J. Med. Pharm. Chem. 5, 383 (1962). Using this procedure when R"NH$_2$ was butylamine, the yield of product was about 20%.

Another related method reported more recently by Bartlett and Humphrey, J. Chem. Soc. 1967, 1664, is by the transamination of N,N-dimethylformamide azine with primary amines.

The following reaction depicts this

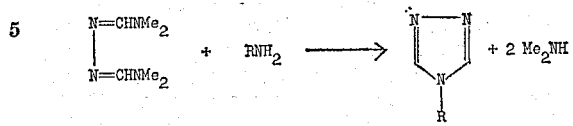

This method requires isolation of the intermediate azine.

The novel method of preparation of this invention consists in the reaction of an orthoformate, (R'O)$_3$H, with formylhydrazine to give an N-alkoxymethylene-N'-formylhydrazine which is then reacted with a primary amine, RNH$_2$, wherein R has the meaning given above. The following reaction depicts this:

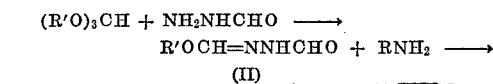

The orthoformates used are those where R' is alkyl and preferably where R' is lower alkyl of 1 to 6 carbon atoms. Typical of these is where R' is methyl, ethyl or isopropyl. Orthoformates are well-known compounds and are products of commerce.

Formyl hydrazine is a product of commerce.

N-ethoxymethylene-N'-formylhydrazine is typical of the compounds of Formula II and is known from the work of Ainsworth and Hackler, J. Org. Chem. 31, 3442–4 (1966). The intermediate N-alkoxymethylene-N'-formylhydrazine may be isolated, or may be used directly without isolation, for the subsequent reaction with the primary amine.

For the reaction of the orthoformate with formylhydrazine, equimolar quantities of the reactants may be used or else an excess of the orthoformate up to 100% molar excess may be used. An acid catalyst, such a formic acid, may sometimes facilitate the reaction of the orthoformate with formylhydrazine.

For the reaction of an N-alkoxymethylene-N'-formylhydrazine with the primary amine, equimolar quantities are usually used although up to 100% molar excess of the amine may be used.

Although the series of reactions will proceed without the use of a solvent, a solvent is preferred. The preferred solvent is an anhydrous alcohol, such as anhydrous methanol, ethanol or isopropanol. A small amount of water may be tolerated, but even with 95% ethanol considerable by-products, notably 4-formylamino-1,2,4-triazole, are obtained.

The series of reactions will proceed at room temperature and in the range of 0° to 150° C. Reflux temperatures in the range of 50° to 100° C. are preferred.

The resulting 4-substituted-1,2,4-triazoles may be isolated as the crude product or may be purified by standard means, such as distillation or recrystallization. Structures may be confirmed by spectral data such as nmr.

The following examples are offered to illustrate the method of preparation of this invention and are not to be construed as limitations thereof.

EXAMPLE 1

Preparation of 4-butyl-1,2,4-triazole

A 2-liter flask was charged with 440 g. (3 moles) of triethyl orthoformate, 120 g. (2 moles) of formylhydrazine and 800 ml. of anhydrous methanol. The reaction mixture was stirred at reflux temperature (65–70° C.) for 3.5 hrs. The progress of the reaction was followed hourly by means of gas-liquid chromatography. The reaction mixture was cooled to 60° C. and 145 g. (2 moles) of n-butylamine was added in 15 minutes. A slight exotherm raised the temperature about 5° C. The reaction mixture was stirred at reflux temperature for 3 hrs. and was then stripped of solvent and excess triethyl orthoformate by heating on a steam bath at reduced pressure, down to 20 mm. There was obtained a yellow oil residue of 250 g. which by elution gas-liquid chromatography was shown to be at least 85% of 4-butyl-1,2,4-triazole. A further stripping of this residue at a pot temperature of 190° C. and 10 mm. pressure gave 216 g. of light amber oil residue which was an 86% yield of crude 4-butyl-1,2,4-triazole shown to be 93% pure by gas-liquid chromatography. The product was further purified by distillation. The main fraction distilled at 185° C. at 2 mm. pressure and was a 77% weight yield of 4-n-butyl-1,2,4-triazole melting at 50° C.

EXAMPLE 2

Preparation of 4-isoamyl-1,2,4-triazole

A reaction mixture consisting of 10 g. (0.086 mole) of N-ethoxymethylene-N'-formylhydrazine, 7.5 g. (0.086 mole) of isoamylamine and 200 cc. of absolute ethanol was heated at reflux for 16 hrs. The ethanol was removed by heating under vacuum and the residue distilled. A main fraction distilled at 153°–163° C./0.2 mm. and amounted to 5.4 g. This was found to contain by analysis 60.5% C, 9.7% H, and 30.4% N; calculated for $C_7H_{13}N_3$ is 60.4% C, 9.4% H, and 30.2% N. The product is 4-isoamyl-1,2,4-triazole.

EXAMPLE 3

Preparation of 4-phenyl-1,2,4-triazole

A reaction mixture consisting of 10 g. (0.086 mole) of N-ethoxymethylene-N'-formylhydrazine, 8.0 g. (0.086 mole) of aniline and 200 cc. of absolute ethanol was heated at reflux for 16 hrs. The resulting product was stripped of solvent leaving solid residue. The residue was recrystallized from benzene to 4.6 g. of solid melting at 101°–102° C., which was 4-phenyl-1,2,4-triazole.

EXAMPLE 4

Preparation of 4-(2-pyridyl)-1,2,4-triazole

A reaction mixture consisting of 10 g. (0.086 mole) of N-ethoxymethylene-N'-formylhydrazine, 8.1 g. (0.086 mole) of 2-aminopyridine and 200 cc. of absolute ethanol was heated at reflux for 16 hrs. The solvent was stripped off. The resulting residue was recrystallized from benzene to give 7.4 g. of solid melting at 145°–147° C., which was 4-(2-pyridyl)-1,2,4-triazole.

EXAMPLE 5

Preparation of 4-[β-(2,4-dichlorophenoxy)ethyl]-1,2,4-triazole

A reaction mixture consisting of 10 g. (0.086 mole) of N-ethoxymethylene-N'-formylhydrazine, 17.7 g. (0.086 mole) of β-(2,4-dichlorophenoxy)ethylamine and 100 cc. of absolute ethanol was heated at reflux for 16 hrs. The solvent was then stripped off leaving a solid. The solid was recrystallized from acetone/hexane to give 7 g. melting at 115°–117° C. This was found to contain by analysis 46.6% C, 3.7% H, 27.2% Cl, 16.3% N and 6.8% O; calculated for $C_{10}H_9Cl_2N_3O$ is 46.5% C, 3.5% H, 27.5% Cl, 16.3% N and 6.2% O. The product is 4-[β-(2,4-dichlorophenoxy)ethyl]-1,2,4-triazole.

EXAMPLE 6

Preparation of 4-[β-(4-chlorothiophenoxy)ethyl]-1,2,4-triazole

A reaction mixture consisting of 5.75 g. (0.0495 mole) of N-ethoxymethylene-N'-formylhydrazine 9.3 g. (0.0495 mole) of β-(4-chlorothiophenoxy)ethylamine and 100 cc. of absolute ethanol was heated at reflux for 16 hrs. The solvent was stripped off leaving a solid residue. The product was recrystallized from acetone/hexane to give 6 g. of solid melting at 73°–75° C. This was found to contain by analysis 49.9% C, 4.2% H, 14.7% Cl, 17.6% N and 13.2% S; calculated for $C_{10}H_{10}ClN_3S$ is 50.3% C, 4.2% H, 14.65% Cl, 17.6% N and 13.4% S. The product is 4-[β-(4-chlorothiophenoxy)ethyl]-1,2,4-triazole.

The following Table I lists typical 4-substituted-1,2,4-triazoles which may be prepared by this novel method.

TABLE I 4-substituted-1,2,4-triazoles of the formula

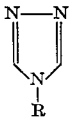

| Prop. | R | Melting (° C.) or boiling point (° C./mm.) | Empirical formula | Analytical data, percent C | H | N |
|---|---|---|---|---|---|---|
| A | Cyclopropyl | 90–93° | $C_5H_7N_3$ | 54.8 (55.0) | 6.5 (6.4) | 38.4 (38.6) |
| B | n-$C_3H_7$ | 120–125°/.06 mm | $C_5H_9N_3$ | 52.8 (54.0) | 8.8 (8.1) | 37.2 (37.9) |
| C | n-$C_4H_9$ | 130–142°/2 mm | $C_6H_{11}N_3$ | J. Chem. Soc. 1967, 1664 | | |
| D | sec-$C_4H_9$ | 130°/.1 mm | $C_6H_{11}N_3$ | 56.5 (57.6) | 9.6 (8.8) | 34.2 (33.6) |
| E | i-$C_4H_9$ | 128–132°/.1 mm | $C_6H_{11}N_3$ | 57.8 (57.6) | 9.2 (8.8) | 33.6 (33.6) |
| F | t-$C_4H_9$ | 69–72° | $C_6H_{11}N_3$ | 51.0 (57.6) | 9.3 (8.8) | 39.5 (33.6) |
| G | n-$C_5H_{11}$ | 138–148°/.1 mm | $C_7H_{13}N_3$ | 60.3 (60.4) | 8.9 (9.4) | 31.1 (30.2) |
| H | i-$C_5H_{11}$ | 153–163°/.2 mm | $C_7H_{13}N_3$ | 60.5 (60.4) | 9.7 (9.4) | 30.4 (30.2) |
| I | n-$C_6H_{13}$ | 145–155°/.05 mm | $C_8H_{15}N_3$ | 32.6 (62.7) | 9.8 (9.8) | 27.3 (27.5) |
| J | 2-ethylhexyl | 147°/.05 mm | $C_{10}H_{19}N_3$ | 66.0 (66.3) | 10.8 (10.6) | 23.4 (23.2) |
| K | n-$C_8H_{17}$ | 167–174°/.01 mm | $C_{10}H_{19}N_3$ | 65.7 (66.3) | 10.7 (10.6) | 24.4 (23.2) |
| L | n-$C_{10}H_{21}$ | 35–37° | $C_{12}H_{23}N_3$ | 68.7 (68.9) | 11.1 (11.0) | 20.0 (20.1) |
| M | n-$C_{12}H_{25}$ | 51–53° | $C_{14}H_{27}N_3$ | 70.5 (70.9) | 10.6 (11.5) | 17.5 (17.7) |
| N | Propargyl | 145–153°/.05 mm | $C_5H_5N_3$ | 53.4 (56.1) | 4.7 (4.7) | 39.4 (39.2) |
| O | 1,1-dimethyl-propargyl | 108–111° | $C_7H_9N_3$ | 62.1 (62.1) | 6.8 (6.7) | 31.1 (31.2) |
| P | $HOCH_2CH_2CH_2$ | Semisolid | $C_5H_9N_3O$ | 46.8 (47.2) | 7.6 (7.1) | 29.9 (33.0) |
| Q | $C_2H_5OCH_2CH_2$ | 145–149°/.05 mm | $C_6H_{11}N_3O$ | 49.5 (51.0) | 7.3 (7.9) | 29.8 (29.8) |
| R | $CH_3OCH_2CH_2CH_2$ | 130–140°/.05 mm | $C_6H_{11}N_3O$ | 51.5 (51.1) | 8.3 (7.8) | 30.2 (29.8) |
| S | $C_2H_5OCH_2CH_2CH_2$ | 125–132°/.2 mm | $C_7H_{13}N_3O$ | 53.2 (54.2) | 8.7 (8.4) | 27.6 (27.1) |
| T | $(CH_3)_2CHOCH_2CH_2CH_2$ | 156–164°/.2 mm | $C_8H_{15}N_3O$ | 59.6 (56.8) | 8.3 (8.9) | 25.5 (24.8) |
| U | $(C_2H_5)_2NCH_2CH_2$ | 155–168°/.05 mm | $C_8H_{16}N_4$ | 56.7 (57.1) | 10.6 (9.6) | 34.4 (33.3) |
| V | $C_2H_5OOCCH_2CH(CH_3)$ | 170–172°/.2 mm | $C_8H_{13}N_3O_2$ | 50.3 (52.4) | 6.5 (7.1) | 25.7 (22.9) |
| W | $C_6H_5$ | 118–121° | $C_8H_7N_3$ | J. Chem. Soc. 1967, 1664 | | |
| X | 2,4-$Cl_2C_6H_3$ | 203–206° | $C_8H_5Cl_2N_3$ | J. Med. Pharm. Chem. 5, 383 (1962) | | |
| Y | 3,4-$Cl_2C_6H_3$ | 172–174° | $C_8H_5Cl_2N_3$ | 45.1 (44.9) | 2.3 (2.3) | 19.4 (19.6) |
| Z | 3-$NO_2C_6H_4$ | 242–245° | $C_8H_6N_4O_2$ | 50.4 (50.6) | 3.1 (3.1) | 30.0 (29.5) |
| AA | 4-$NO_2C_6H_4$ | >300° | $C_8H_6N_4O_2$ | J. Med. Pharm. Chem. 5, 383 (1962) | | |
| AB | 4-$CH_3OC_6H_4$ | 108–110° | $C_9H_9N_3O$ | J. Med. Pharm. Chem. 5, 383 (1962) | | |
| AC | $C_6H_5CH_2$ | 112–114° | $C_9H_9N_3$ | J. Chem. Soc. 1967, 1664 | | |
| AD | 4-$ClC_6H_4CH_2$ | 200–208°/.05 mm | $C_9H_8ClN_3$ | 55.7 (55.8) | 4.6 (4.1) | 21.7 (21.7) |
| AE | 2,4-$Cl_2C_6H_3CH_2$ | 169–171° | $C_9H_7Cl_2N_3$ | 47.7 (47.5) | 3.4 (3.1) | 18.4 (18.4) |
| AF | 3,4-$Cl_2C_6H_3CH_2$ | 133–135° | $C_9H_7Cl_2N_3$ | 47.6 (47.5) | 3.2 (3.1) | 18.5 (18.4) |

TABLE I—Continued

| Prep. | R | Melting (° C.) or boiling point (° C./mm.) | Empirical formula | Analytical data,[a] percent | | |
|---|---|---|---|---|---|---|
| | | | | C | H | N |
| AG | 4-CH$_3$OC$_6$H$_4$CH$_2$ | 101–103° | C$_{10}$H$_{11}$N$_3$O | 62.9 (63.4) | 5.9 (5.9) | 22.1 (22.2) |
| AH | C$_6$H$_5$CH$_2$CH$_2$ | 182–185°/.02 mm | C$_{10}$H$_{11}$N$_3$ | 69.0 (69.3) | 6.8 (6.4) | 24.2 (24.3) |
| AI | 4-pyridyl | 230–231° | C$_7$H$_6$N$_4$ | 57.8 (57.5) | 4.0 (4.1) | 38.1 (38.4) |
| AJ | 2-pyridyl | 162–163° | C$_7$H$_6$N$_4$ | J. Org. Chem. 18, 1368 (1953) | | |
| AK | 4-(1,2,4-triazyl) | 276–277° | C$_4$H$_4$N$_6$ | J. Chem. Soc. 1967, 1664 | | |
| AL | 3-(1,2,4-triazyl) | 190–195° | C$_4$H$_4$N$_6$ | J. Org. Chem. 18, 1368 (1953) | | |
| AM | 2-pyrimidyl | 246–249° | C$_6$H$_5$N$_5$ | 49.2 (49.0) | 3.3 (3.4) | 47.6 (47.6) |
| AN | 2-thiazyl | 127–129° | C$_5$H$_4$N$_4$S | 39.5 (39.5) | 2.5 (2.7) | 37.2 (36.8) |
| AO | 2-benzothiazyl | 199–201° | C$_9$H$_6$N$_4$S | 54.0 (53.5) | 3.3 (3.0) | 27.6 (27.7) |
| AP | 2-(4-chlorobenzothiazyl) | 187–189° | C$_9$H$_5$ClN$_4$S | 46.6 (45.7) | 2.7 (2.1) | 24.1 (23.7) |
| AQ | C$_6$H$_5$OCH$_2$CH$_2$ | 75–78° | C$_{10}$H$_{11}$N$_3$O | 62.0 (63.5) | 5.9 (5.9) | 21.5 (22.2) |
| AR | 2,4-Cl$_2$C$_6$H$_3$OCH$_2$CH$_2$ | 115–117° | C$_{10}$H$_9$Cl$_2$N$_3$O | 46.6 (46.5) | 3.7 (3.5) | 16.3 (16.3) |
| AS | 4-ClC$_6$H$_4$OCH$_2$CH$_2$ | 74–75° | C$_{10}$H$_{10}$ClN$_3$O | 50.8 (53.8) | 4.4 (4.5) | 20.9 (18.9) |
| AT | 4-ClC$_6$H$_4$SCH$_2$CH$_2$ [b c] | 73–75° | C$_{10}$H$_{10}$ClN$_3$S | 49.9 (50.3) | 4.2 (4.2) | 14.7 (14.7) |
| AU | 4-CH$_3$OC$_6$H$_4$SCH$_2$CH$_2$ [b d] | 74–76° | C$_{11}$H$_{13}$N$_3$OS | 56.2 (56.2) | 5.7 (5.5) | 18.1 (17.9) |
| AV | 3,4-Cl$_2$C$_6$H$_3$SCH$_2$CH$_2$ [b e] | 127–129° | C$_{10}$H$_9$Cl$_2$N$_3$S | 43.8 (43.7) | 3.5 (3.3) | 15.1 (15.3) |

[a] Figures in parentheses are those calculated from the empirical formula.
[b] The intermediate Aryl-SCH$_2$CH$_2$NH$_2$ was made by reaction of 2-chloroethylamine hydrochloride with the appropriate sodium thiophenate.
[c] 4-ClC$_6$H$_4$SCH$_2$CH$_2$NH$_2$ distilled at 97–100° C./.1 mm. and was found by analysis to contain 51.2% C, 5.5% H, 19.1% Cl, 7.32% N and 16.2% S; calculated for C$_8$H$_{10}$ClNS is 51.1% C, 5.4% H, 18.9% Cl, 7.5% N and 17.1% S.
[d] 4-CH$_3$OC$_6$H$_4$SCH$_2$CH$_2$NH$_2$ distilled at 110–116° C./.01 mm. and was found by analysis to contain 57.7% C, 6.9% H, 7.3% N, 11.0% O and 17.3% S; calculated for C$_9$H$_{13}$NOS is 59.0% C, 7.1% H, 7.7% N, 8.7% O and 17.5% S.
[e] 3,4-Cl$_2$C$_6$H$_3$SCH$_2$CH$_2$NH$_2$ distilled at 160–161° C./.05 mm. and was found by analysis to contain 43.0% C, 4.6% H, 32.0% Cl, 6.2% N and 14.3% S; calculated for C$_8$H$_9$Cl$_2$NS is 43.3% C, 4.0% H, 32.0% Cl, 6.3% N and 14.4% S.

I claim:
1. A method for preparing a compound of the formula

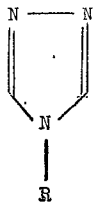

wherein R is selected from the group consisting of alkyl, straight or branched, of 1 to 12 carbon atoms which may be substituted with lower alkoxy, hydroxy, phenyl, a di-(lower-alkyl)amino group, a COY group wherein Y stands for lower alkyl, and a phenoxy group which may be substituted with lower alkoxy, or chloro groups; alkynyl of 2 to 6 carbon atoms; cycloalkyl of 3 to 8 carbon atoms; benzyl; benzyl substituted with lower alkoxy, or chloro groups; phenyl; and heterocyclic groups selected from the class consisting of 2-pyridyl, 3-pyridyl, 4-pyridyl, 3-(1,2,4-triazyl), 4-(1,2,4-triazyl), 2-pyrimidyl, 2-thiazyl and 2-benzothiazyl which comprises reacting an N-alkoxymethylene-N'-formyhydrazine of the formula

R'OCH=NNHCHO wherein R' is an alkyl group, with a primary amine of the formula RNH$_2$, wherein R has the meaning given above.

2. A method according to claim 1 wherein R is an alkyl group.

3. A method according to claim 1 wherein R is a butyl group.

4. A method according to claim 1 wherein R' is an alkyl group of 1 to 6 carbon atoms.

References Cited

Ainsworth et al.: J. Org. Chem., vol. 31, pp. 3442–3444 (1966).

ALTON D. ROLLINS, Primary Examiner

U.S. Cl. X.R.

260—256.4 N, 296 R, 305, 306.8 R; 424—251, 263, 269, 270